United States Patent
Kim et al.

(10) Patent No.: US 7,581,161 B2
(45) Date of Patent: Aug. 25, 2009

(54) METHOD AND SYSTEM FOR WIDENING THE SYNCHRONIZATION RANGE FOR A DISCRETE MULTITONE MULTICARRIER SINGLE PILOT TONE SYSTEM

(75) Inventors: Young Han Kim, Andover, MA (US); Vitali Vinokour, Brookline, MA (US)

(73) Assignee: Analog Devices, Inc., Norwood, MA (US)

( * ) Notice: Subject to any disclaimer, the term of this patent is extended or adjusted under 35 U.S.C. 154(b) by 541 days.

(21) Appl. No.: 10/838,415

(22) Filed: May 4, 2004
(Under 37 CFR 1.47)

(65) Prior Publication Data
US 2006/0156151 A1 Jul. 13, 2006

(51) Int. Cl.
*G06F 11/00* (2006.01)
(52) U.S. Cl. .................. 714/799; 714/758; 714/798; 375/326; 375/347
(58) Field of Classification Search ................ 714/798, 714/758, 799; 375/326, 347
See application file for complete search history.

(56) References Cited

U.S. PATENT DOCUMENTS

| | | | | |
|---|---|---|---|---|
| 6,222,891 | B1* | 4/2001 | Liu et al. | 375/326 |
| 6,307,868 | B1* | 10/2001 | Rakib et al. | 370/485 |
| 6,549,561 | B2* | 4/2003 | Crawford | 375/137 |
| 6,920,189 | B1* | 7/2005 | Spalink | 375/326 |
| 2001/0017897 | A1* | 8/2001 | Ahn | 375/261 |
| 2002/0039052 | A1* | 4/2002 | Straub et al. | 331/45 |
| 2003/0058967 | A1* | 3/2003 | Lin et al. | 375/327 |
| 2003/0161414 | A1* | 8/2003 | Jun | 375/326 |

* cited by examiner

*Primary Examiner*—Esaw T Abraham
(74) *Attorney, Agent, or Firm*—Goodwin Procter LLP

(57) ABSTRACT

A system and method of widening the synchronization range for a discrete multitone multicarrier single pilot tone system includes detecting a first phase error in a received pilot tone; detecting a second phase error in a received second two bit constellation data channel; converting the second phase error to a first quadrant angle between 0-90° and combining the first phase error and the converted phase error to obtain the actual phase error up to and beyond 360°.

2 Claims, 4 Drawing Sheets

US 7,581,161 B2

METHOD AND SYSTEM FOR WIDENING THE SYNCHRONIZATION RANGE FOR A DISCRETE MULTITONE MULTICARRIER SINGLE PILOT TONE SYSTEM

FIELD OF THE INVENTION

This invention relates to a method and system for widening the synchronization range of a discrete multitone (DMT) multicarrier single pilot tone system.

BACKGROUND OF THE INVENTION

In discrete multitone (DMT) systems there is usually employed a number of discrete carrier channels e.g. 256 spaced apart by a fixed amount e.g. 4.3125 KHz. According to ITU conventions all 256 channels carry data except one, typically the $64^{th}$ which is a pure tone used to synchronize the receiver clock with the transmitter using phased lock loop circuits to insure accuracy of frequency and phase and of frame definition between the transmitter and receiver. These systems work well for small phase error but when a larger, micro-interruption occurs the errors can exceed 360° so that the circuit, e.g. a modem cannot detect whether the error was just $\epsilon$ or $\epsilon+360°$ or $\epsilon+720°$ .... When this occurs the entire modem or other system must be turned off and then on again to allow the modem to completely retrain itself. The use of another channel providing a second pure tone would allow for a detection of errors over 360°, 720° or greater but conventional protocols do not permit that.

Separately, even though the receiver corrects the synchronization clock a few thousand times per second the temperature drift, and other effects can be too much to adjust for and the error can exceed the bounds of 360°, 720° .... An attempt to correct the higher drift introduces jitter into the clock signal, which is undesirable.

BRIEF SUMMARY OF THE INVENTION

It is therefore an object of this invention to provide an improved wider range synchronization method and system for a DMT multicarrier single pilot tone system.

It is a further object of this invention to provide such an improved wider range synchronization method and system for a DMT multicarrier single pilot tone system which requires no more than the one available pilot tone channel.

It is a further object of this invention to provide such an improved wider range synchronization method and system for a DMT multicarrier single pilot tone system which adjusts for increased drift without introducing undesirable jitter.

The invention results from the realization that a truly effective wider range synchronization method and system for DMT multicarrier single pilot tone arrangements can be achieved by combining the phase error from a second data channel, preferably a two bit constellation data channel, with the phase error from the pilot tone channel to get the true error up to and beyond 360° or multiples thereof, and from the further realization that the phase error from the data channel can be obtained directly from the data without decoding the carrier by rotating the phase error to the +/−45° range.

This invention features a wide range synchronization system for a DMT multicarrier single pilot tone system including a first error detector circuit responsive to a pilot tone channel for detecting a first phase error in a received pilot tone; and a second error detector circuit responsive to a second two bit constellation data channel for detecting a second phase error in the received second channel. A converter circuit converts the second phase error to a first quadrant angle between 0-90° and a resolver circuit is responsive to the first phase error and the second converted phase error for calculating the actual phase error up to and beyond 360°.

The invention also features a method of widening the synchronization range for a DMT multicarrier single pilot tone system including detecting a first phase error in a received pilot tone and a second phase error in a received second two bit constellation data channel. The second phase error is converted to a first quadrant angle between 0-90° and the first phase error and the second converted phase error are combined to obtain the actual phase error up to and beyond 360°.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
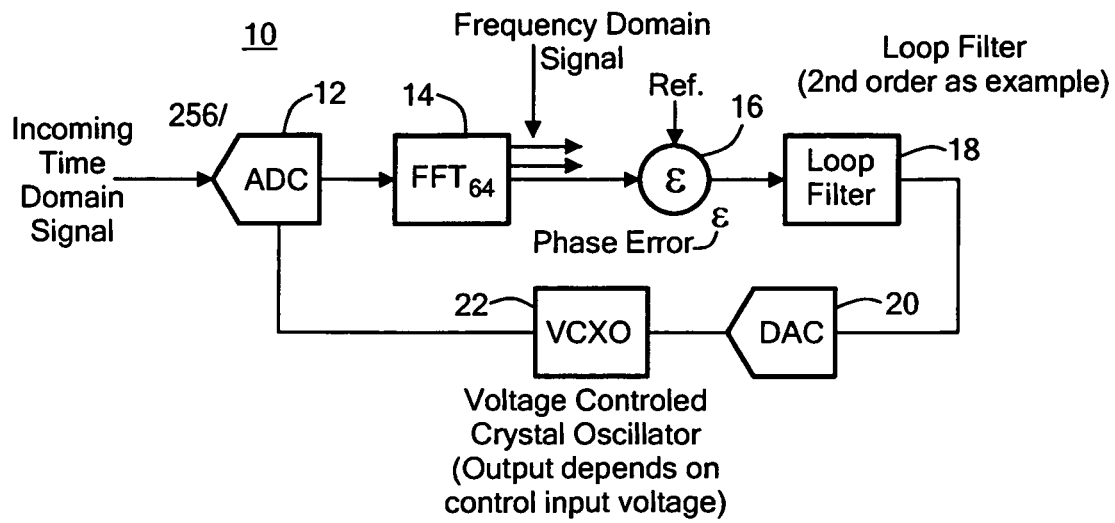
FIG. 1 is a schematic block diagram of a conventional prior art DMT system.

There is shown in FIG. 1 a prior art DMT multicarrier system 10, which receives 256 channels, at its input, discretely spaced by 4.3125 KHz for example. Of these 256 channels all of them are data channels except one, for example channel 64, which is a pure tone used to synchronize the receiver clock with the transmitter clock. The incoming signals are received by analog to digital converter 12 whose digital output is delivered to fast Fourrier transform circuit 14 which provides 255 of the 256 channels as data output to be further processed, not of interest here, and one of those channels, channel 64 containing the pilot tone is used to synchronize the clock in the receiver. The output from the fast Fourier transform circuit 14 representative of the pilot tone is delivered to phase error detection circuit 16 where it is compared to a reference signal to produce the phase error output to loop filter 18. The output of loop filter is fed back through digital to analog converter 20 which drives a voltage controlled crystal oscillator 22 which now puts out the corrected clock frequency signal to A to D converter 12. As discussed earlier in the Background, this system works well for small error corrections, but for micro interruptions or larger interruptions where the phase error may exceed 360°, this approach does not work as it can not deal with identifying where the error occurred when it occurs beyond 360°.

Figure 2:
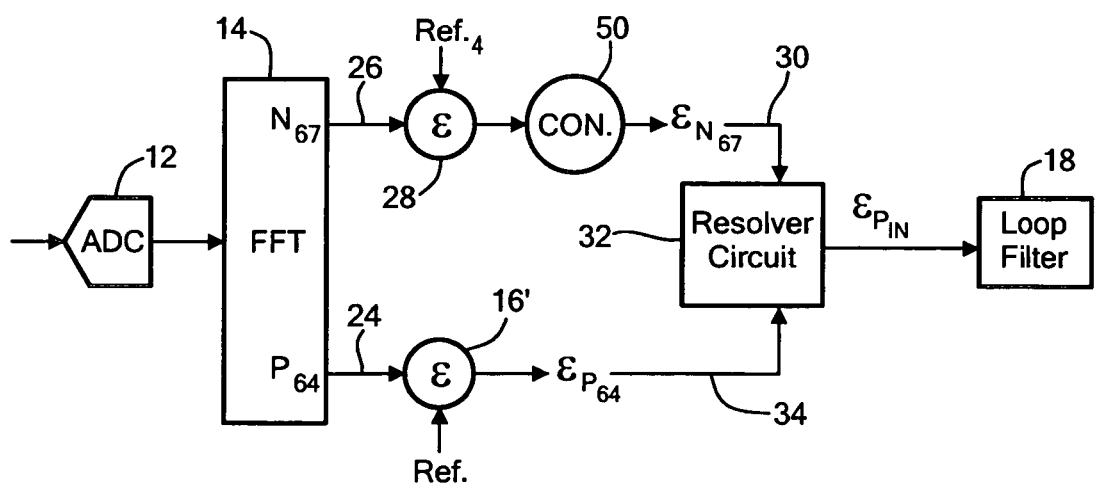
FIG. 2 is a schematic block diagram of a portion of the system of FIG. 1 showing the improvement circuit according to this invention.

To address this problem an improved technique using the error signal 24, FIG. 2, from the pilot tone, as well as an error signal derived from one of the data channels 26 is used.

In conventional operation when a modem or similar device is setting up it goes through a self training routine in which it checks out all the channels and determines which are the most noise free and which are most suitable for carrying more or less data. At this time the invention according to this system chooses a data channel N for example 67 to use in conjunction with the pilot tone channel to calculate errors in excess of 360°. For example the N channel in this particular example channel 67, is combined in error detection circuit 28 with a reference signal to determine the phase error signal 30 for delivery to resolver circuit 32 which also receives the phase error signal $\epsilon_{P64}$ 34 from error detection circuit 16'.

Figure 3:
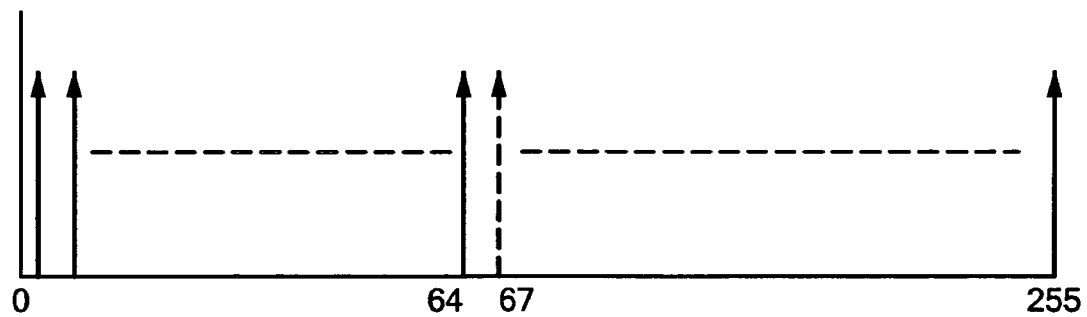
FIG. 3 is an illustration of the frequency spectrum of the 256 channels employed in FIGS. 1 and 2.
Figure 4:
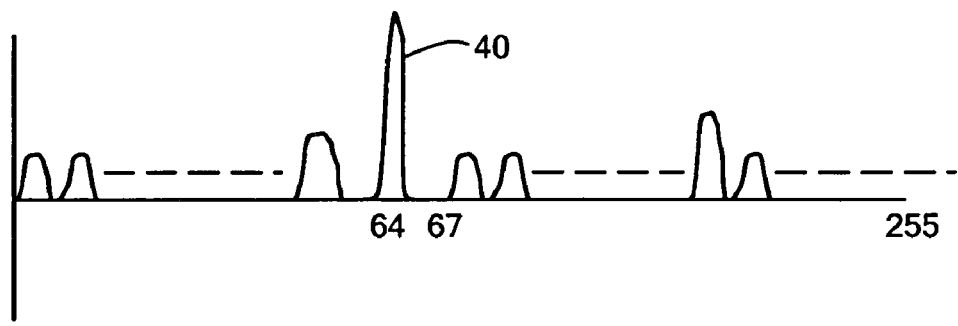
FIG. 4 is an illustration of a frequency spectrum showing the pure pilot tone at the $64^{th}$ channel.
Figure 5:
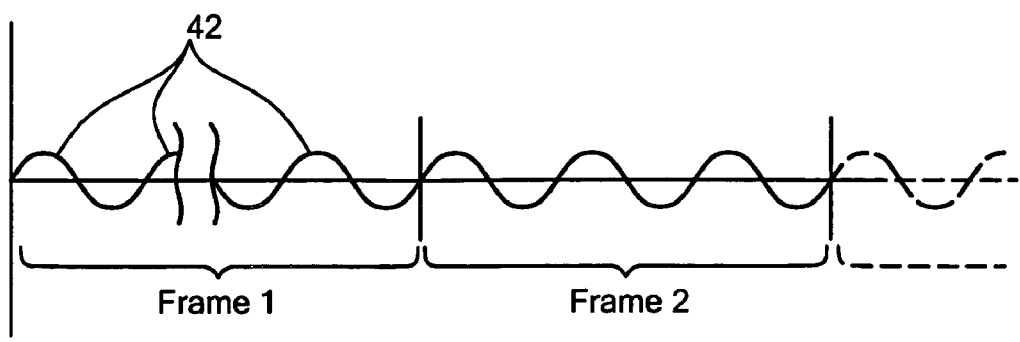
FIG. 5 is an illustration of two frames of the $64^{th}$ channel.
Figure 6:
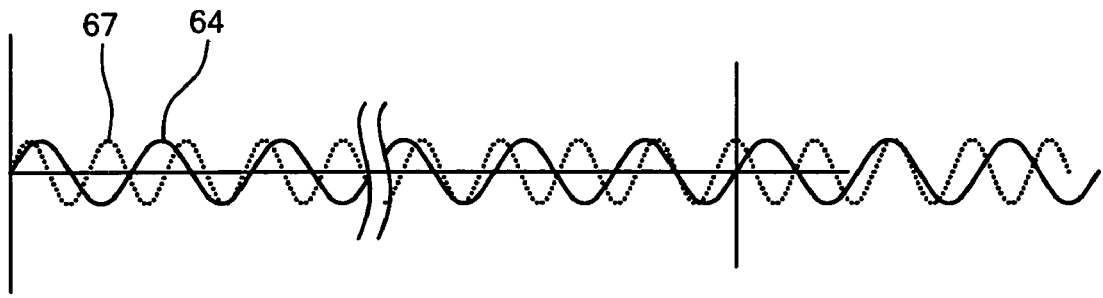
FIG. 6 is a view similar to FIG. 5 showing two frames of both the $64^{th}$ pilot tone channel and the $67^{th}$ two bit constellation data channel.

The 256 channels 0-255, FIG. 3, arriving at ADC 12 are discretely spaced from one another as indicated in this particular example at 4.3125 KHz. Channel 64 contains a pilot tone and is used conventionally in error correction and clock synchronization. Channel 67, having been designated the chosen second channel in accordance with this invention, is programmed to be a two bit constellation data channel, that is, it carries only two bits representing four binary numbers, 00, 01, 10, and 11. While all of the other channels profiles have various shapes and suitability for data transmission, pilot channel 64, FIG. 4, stands out as a pure unmodulated tone 40. In accordance with such DMT systems the transmissions occur in frames, FIG. 5, such as frame 1 and frame 2, each frame containing a number of cycles 42 of the particular frequency assigned to that channel. If a shift or jitter occurs in the clock signal within a cycle it can be detected by conventional means, but if it exceeds a clock cycle, that is it is more than 360°, an ambiguity results. As is known in the prior art one technique for extending or widening the range of the detection is to use a second signal not of the same frequency or a multiple thereof, which is in phase only infrequently, at distances beyond the desired range widening. Thus, for example, by using the two signals of the $64^{th}$ channel and the $67^{th}$ channel an increased range can be acquired for such a system. Thus it is shown, in Table 1 below, that at the 0-360° range with the error in channel 64 at 5° the error in channel 67 would be 5.2°. Beyond 360° the error in channel 67 would be 382.1° or 22.1°, and at 720° the error would be 758.99° or 38.99°. Thus the changing phase error of channel 67 with respect to channel 64 resolves ambiguity in the ranges above 360°, above 720° and beyond.

TABLE 1

| | | |
|---|---|---|
| 0° | $\epsilon_{64}$ | $= 5°$ |
| 0° | $\epsilon_{67}$ | $= 5° \times \frac{67}{64} = 5.2°$ |
| 360° | $\epsilon_{67}$ | $= 365 \times \frac{67}{64} = 382.1 - 360 = 22.1°$ |
| 720° | $\epsilon_{67}$ | $= 725 \times \frac{67}{64} = 758.99 - 720 = 38.99°$ |

One approach to the problem then, is to strip the data off the carrier, in 67 for example or some other channel, and use that in conjunction with the pilot tone to resolve ambiguities above 360°. However, when micro interruptions and larger interruptions disrupt the signal and cause large errors, demodulation or decoding of the data from the carrier signal is meaningless and so the resulting carrier would be unavailing for the purpose of resolving critical phase errors with high accuracy.

Figure 7:
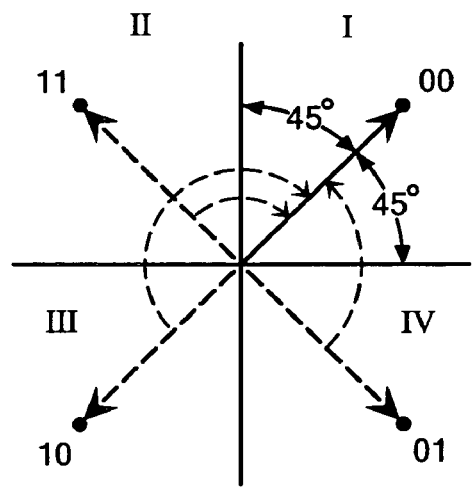
FIG. 7 is a vector diagram showing the representation of the four numbers represented by the two binary bits in the four vector quadrants.
Figure 8:
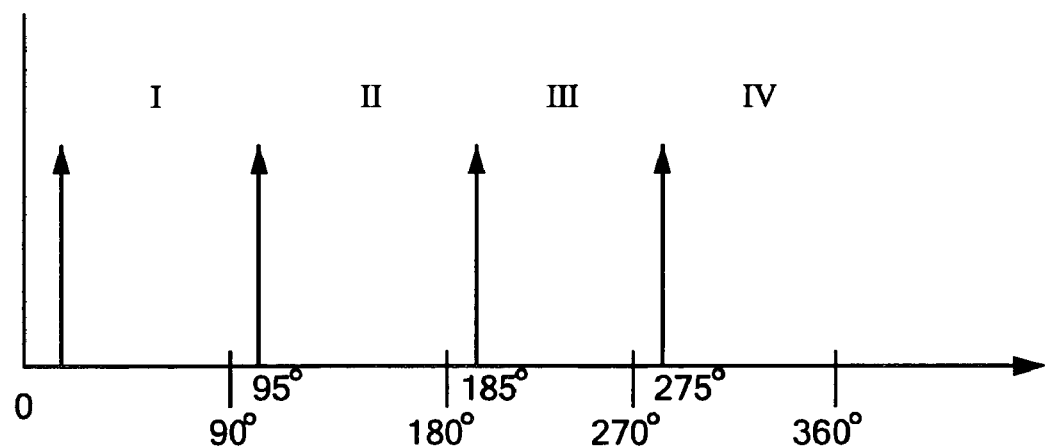
FIG. 8 is a alternative representation of the binning and rotation of the phase errors in accordance with this invention.

In accordance with this invention a two bit constellation data channel is used in such 10 a manner that it doesn't have to be decoded so it does not encounter the problem and the four numbers represented by the two bits can be employed in the phase error calculation. In keeping with conventional design the two bit constellation provides a vector in any one of the four quadrants, I, II, III, IV, FIG. 7, so that a vector in quadrant I represents 00, for example, quadrant II represents 11, quadrant III represents 10, and quadrant IV represents 01, thus the signal delivered by error detection circuit 28, FIG. 2, is first converted so that regardless of whether its in quadrant I, where it need not be converted or rotated, or is in one of quadrants II, I, or IV, where it must be converted, it will end up being a representation of the error +/−45° within the 90° gamut of quadrant I, FIG. 7. Thus for example, if the error signal emanating from error detection circuit 28 is 5° occurring in the first quadrant it will simply be passed through converter 50 and on to resolver circuit 32. However, if the error signal is 95°, in quadrant II, converter 50 will first subtract 90° from it to return to the original 5° error. In a similar fashion if the data input is in quadrant III and reads out as 185°, 180° will be subtracted from to obtain the 5° and if it occurs in quadrant IV, as for example 275°, 270° will be subtracted from it to obtain the 5° once again. With both the $\epsilon_P$ signal from channel 64 and the $\epsilon_N$ signal from, for example channel 67, resolver 32 can execute the equation $$\text{Total Error } \Phi = (\epsilon_p + 2\pi n) = \left(\epsilon_N + \pi \frac{K}{2}\right) \times \frac{64}{N} \quad (1)$$

where $\epsilon_P$ equals the measured error at the pilot tone (0-360°), n equals an integer between −∞ and +∞, $\epsilon_N$ equals measured error at the Nth tone or channel e.g. 67 (+/−45°), and K equals an integer between −∞ and +∞. The system implements the operation in resolver 32 either in software or hardware by solving the equation in an iterative fashion, that is making n=zero and inputting K as 1, 2, 3, 4, 5 . . . up to 10 for example, to find a suitable match, and if one is not found then n is changed to 1 and again K is run from 1-10 for example, and then n may be changed to 2 and K run from, for example, 1-10.

An illustration of this operation is shown Table 2 below

TABLE 2

| n | $\epsilon_P$ (P = 64) | $\epsilon_N$ (N = 67) | $\epsilon_N$ (N = 93) |
|---|---|---|---|
| 1 (0°) | 2° | 2.09° | 2.91° |
| 2 (360°) | 2° | 19.00° | 76.00° |
| 3 (720°) | 2° | 35.80° | 59.00° |
| 4 (. . .) | . . . | . . . | . . . |
| 5 (. . .) | . . . | . . . | . . . | where for n=1 when $\epsilon_P$ of the pilot tone 64 shows a 2° error, then the error at N=67 is 2.09°, making n=2 in the range of 360° with $\epsilon_P$ still at 2°, it can be seen that $\epsilon_N$=19°, and when n=3 in the range of 720°, $\epsilon_P$ is still 2° but now $\epsilon_N$ is 35.80°. Thus it can be seen that a 2° error at $\epsilon_P$ can be quickly checked so that if $\epsilon_N$ is 2.09° then the 2° is the absolute error, if $\epsilon_N$ is 19.0° then the real error is not 2° but 362°. Likewise, if $\epsilon_N$ is 35.80° then the real error $\epsilon_P$ is not 2° but rather 722°. As can be seen from the fourth column of the table similar results can be obtained with N=93 where the phase error angles show up as 2.91°, 76.0° and 59.0°. Resolver 32 can calculate this directly each time, or at the time of the initial self-training it can calculate the entire table and store it for reference as needed.

Figure 9:
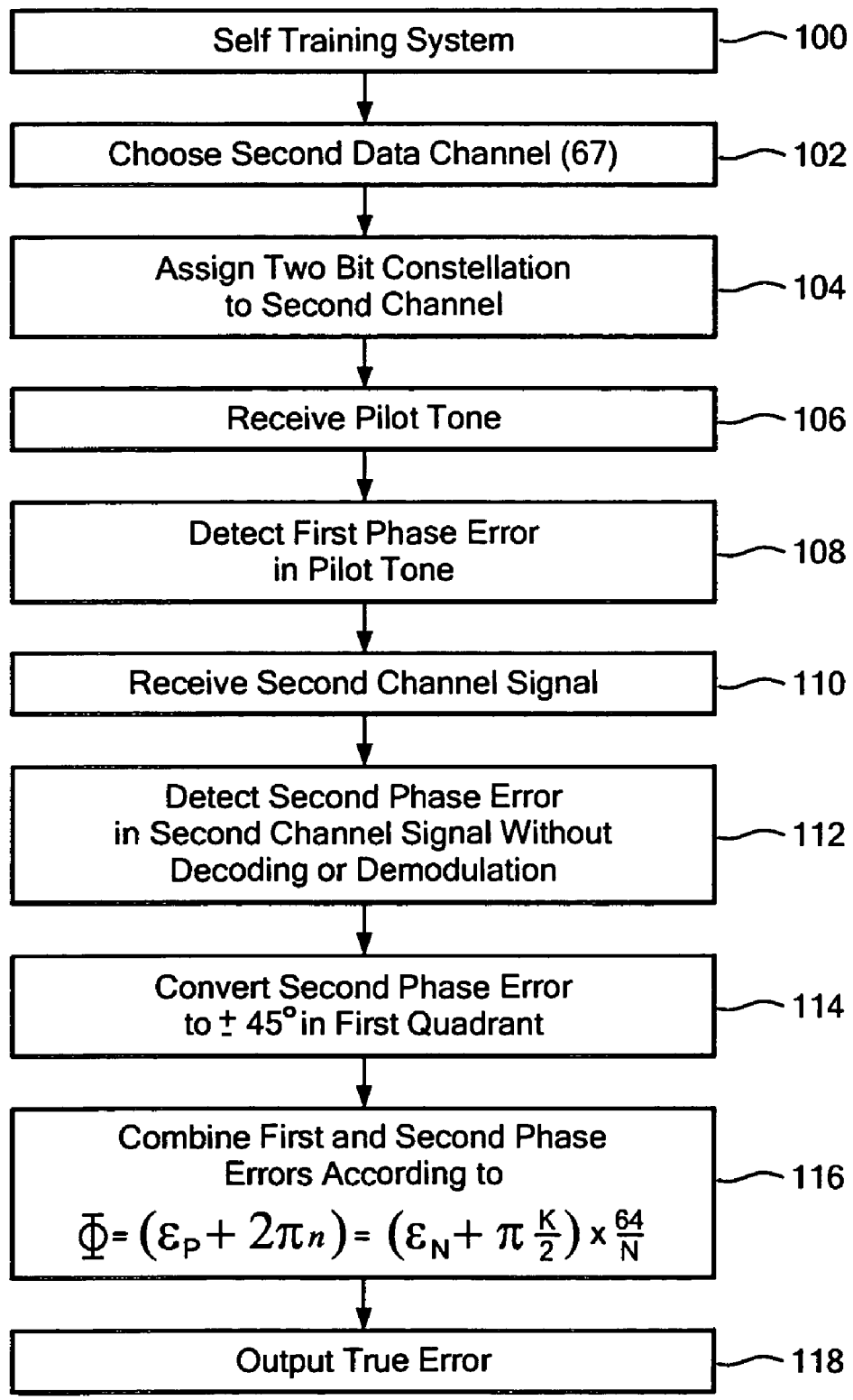
FIG. 9 is a block diagram for software implementation of the invention.

The invention may can be implemented in software wherein a digital signal processor may be used to replace the error detection circuits 28 and 16', converter 50 and resolver 32 in FIG. 2, and operates as shown in FIG. 9 where in step 100 the system goes through its self training step after which its chooses a second data channel, 67, in step 102. It then assigns a two bit constellation to that second channel in step 104, and waits to receive the pilot tone in 106. It then detects the first phase error in the pilot tone in step 108 and receives the second channel signal in step 110, whereupon it detects the second phase error in the second channel signal without decoding or demodulation in step 112. Steps 106 and 108 can occur simultaneously with steps 110 and 112 and normally do. The second phase error is converted to +/−45° state in the first quadrant in step 114 and then the first and second phase errors are combined in step 116 in accordance with the iterative operation of equation (1). Afterwards the true error is outputted in step 118.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A wide range synchronization system for a discrete multitone multicarrier single pilot tone system comprising:
    a first error detector circuit responsive to a pilot tone channel for detecting a first phase error in a received pilot tone;
    a second error detector circuit responsive to a second two bit constellation data channel for detecting a second phase error in the received second channel;
    a converter circuit for converting said second phase error to a first quadrant angle between 0-90°; and
    a resolver circuit responsive to the first phase error and the second phase converted phase error for calculating the actual phase error up to and beyond 360°.

2. A method for widening the synchronization range for a discrete multitone multicarrier single pilot tone system comprising:
    detecting a first phase error in a received pilot tone;
    detecting a second phase error in a received second two bit constellation data channel;
    converting the second phase error to a first quadrant angle between 0-90°; and
    combining the first phase error and second phase error to obtain the actual phase error up to and beyond 360° and widen the synchronization range.

* * * * *

UNITED STATES PATENT AND TRADEMARK OFFICE
CERTIFICATE OF CORRECTION

| | | |
|---|---|---|
| PATENT NO. | : 7,581,161 B2 | Page 1 of 1 |
| APPLICATION NO. | : 10/838415 | |
| DATED | : August 25, 2009 | |
| INVENTOR(S) | : Young H. Kim et al. | |

It is certified that error appears in the above-identified patent and that said Letters Patent is hereby corrected as shown below:

At column 4, line 16, please delete "IL, I, or IV," and insert --II, III, or IV,--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,581,161 B2 Page 1 of 1
APPLICATION NO. : 10/838415
DATED : August 25, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Signed and Sealed this

Fourteenth Day of September, 2010

David J. Kappos
*Director of the United States Patent and Trademark Office*